(12) United States Patent
Weaver et al.

(10) Patent No.: US 9,382,482 B2
(45) Date of Patent: Jul. 5, 2016

(54) CONTINUOUS LIQUID FUEL PRODUCTION METHODS, SYSTEMS, AND DEVICES

(71) Applicant: Proton Power, Inc., Lenoir City, TN (US)

(72) Inventors: Samuel C. Weaver, Knoxville, TN (US); Daniel L. Hensley, Knoxville, TN (US); Samuel P. Weaver, Boulder, CO (US); Daniel C. Weaver, Boulder, CO (US)

(73) Assignee: PROTON POWER, INC., Lenoir City, TN (US)

( * ) Notice: Subject to any disclaimer, the term of this patent is extended or adjusted under 35 U.S.C. 154(b) by 0 days.

(21) Appl. No.: 14/638,992

(22) Filed: Mar. 4, 2015

(65) Prior Publication Data

US 2015/0306563 A1    Oct. 29, 2015

Related U.S. Application Data

(60) Provisional application No. 61/948,094, filed on Mar. 5, 2014.

(51) Int. Cl.
*C01B 3/00* (2006.01)
*C01B 3/02* (2006.01)
(Continued)

(52) U.S. Cl.
CPC ............ *C10B 53/02* (2013.01); *C10B 47/00* (2013.01); *C10B 49/02* (2013.01); *C10B 57/005* (2013.01);
(Continued)

(58) Field of Classification Search
CPC .............. C01B 3/00; C01B 3/02; C01B 3/32; C01B 3/34; C01B 3/46; C10K 3/00; C10K 3/06; C10K 2200/00; C10K 2200/04; C10K 2200/0461; C10K 2200/0469; C10B 47/00; C10B 49/00; C10B 49/02; C10B 53/00; C10B 53/02; C10B 57/00; C10B 57/005; C10B 57/02; C10L 1/00; C10L 1/02; C10L 1/04; C10L 1/10; C10L 1/12; C10L 2270/00; C10L 2270/02; C10L 2270/023; C10L 2270/026; C10L 2270/04; C10L 2290/00; C10L 2290/02; C10L 2290/08
See application file for complete search history.

(56) References Cited

U.S. PATENT DOCUMENTS 3,446,609 A    5/1969   Reinmuth
4,166,802 A    9/1979   Slater
(Continued)

FOREIGN PATENT DOCUMENTS

CN    20181896159    7/2011
DE    3627307    2/1988
(Continued)

OTHER PUBLICATIONS

Ciferno, Jared P. et al., "Benchmarking Biomass Gasification Technologies for Fuels, Chemicals and Hydrogen Production," prepared for U.S Department of Energy National Energy Technology Laboratory, Jun. 2002, 65 pages.
(Continued)

*Primary Examiner* — Natasha Young
(74) *Attorney, Agent, or Firm* — Wilson Patent Law, LLC

(57) ABSTRACT

Methods, systems, and devices for continuous fuel production are provided. Some embodiments may utilize two pyrolysis platforms, which may utilize biomass as a feedstock. One platform may generally utilize a high temperature pyrolysis process that may generate at least hydrogen and carbon monoxide. This high temperature gas stream may be fed into a lower temperature fast pyrolysis stream as a cover gas. The hot cover gas may react with the fast pyrolysis vapors hydrotreating while the vapors may still be hot and the molecules may still be small. The reacted product may then be distilled on the cool down. This may provide a rapid continuous process for the production of liquid fuels from biomass or other compounds that include carbon-oxygen-hydrogen (C—O—H) compounds.

19 Claims, 10 Drawing Sheets

(51) Int. Cl.

| | | |
|---|---|---|
| C01B 3/32 | (2006.01) | |
| C01B 3/34 | (2006.01) | |
| C01B 3/46 | (2006.01) | |
| C10K 3/00 | (2006.01) | |
| C10K 3/06 | (2006.01) | |
| C10B 47/00 | (2006.01) | |
| C10B 49/02 | (2006.01) | |
| C10B 53/02 | (2006.01) | |
| C10B 57/00 | (2006.01) | |
| C10B 57/02 | (2006.01) | |
| C10L 1/02 | (2006.01) | |
| C10L 1/04 | (2006.01) | |
| C11B 1/12 | (2006.01) | |
| C10B 49/00 | (2006.01) | |
| C10B 53/00 | (2006.01) | |
| C10L 1/00 | (2006.01) | |
| C10L 1/10 | (2006.01) | |
| C10L 1/12 | (2006.01) | |

(52) U.S. Cl.
CPC . *C10B 57/02* (2013.01); *C10K 3/06* (2013.01); *C10L 1/02* (2013.01); *C10L 1/04* (2013.01); *C11B 1/12* (2013.01); *C10L 2200/0469* (2013.01); *C10L 2270/023* (2013.01); *C10L 2270/026* (2013.01); *C10L 2270/04* (2013.01); *C10L 2290/02* (2013.01); *C10L 2290/08* (2013.01); *Y02E 50/14* (2013.01); *Y02E 50/32* (2013.01)

(56) References Cited

U.S. PATENT DOCUMENTS

| | | | |
|---|---|---|---|
| 4,211,540 A | 7/1980 | Netzer | |
| 4,324,643 A | 4/1982 | Durai-Swamy | |
| 4,424,065 A | 1/1984 | Langhoff | |
| 4,435,374 A | 3/1984 | Helm | |
| 4,448,588 A | 5/1984 | Cheng | |
| 4,497,637 A | 2/1985 | Purdy | |
| 4,592,762 A | 6/1986 | Babu | |
| 4,824,580 A | 4/1989 | Standridge | |
| 5,417,817 A | 5/1995 | Dammann | |
| 6,133,328 A | 10/2000 | Lightner | |
| 6,141,796 A | 11/2000 | Cummings | |
| 6,149,859 A | 11/2000 | Jahnke | |
| 6,250,236 B1 | 6/2001 | Feizollahi | |
| 6,455,011 B1 | 9/2002 | Fujimura | |
| 6,830,597 B1 | 12/2004 | Green | |
| 7,105,244 B2 | 9/2006 | Kamo | |
| 7,132,183 B2 | 11/2006 | Galloway | |
| 7,144,826 B2 | 12/2006 | Roters | |
| 7,192,666 B2 | 3/2007 | Calhoon | |
| 7,208,530 B2 | 4/2007 | Norbeck | |
| 7,220,502 B2 | 5/2007 | Galloway | |
| 7,473,285 B2 | 1/2009 | Russell | |
| 7,658,776 B1 * | 2/2010 | Pearson | C10J 3/485 48/62 R |
| 8,236,173 B2 | 8/2012 | Bartek | |
| 8,303,676 B1 * | 11/2012 | Weaver | C01B 3/0094 423/650 |
| 8,541,637 B2 | 9/2013 | Babicki | |
| 8,696,775 B2 | 4/2014 | Weaver | |
| 9,023,124 B2 | 5/2015 | Weaver | |
| 9,023,243 B2 | 5/2015 | Weaver | |
| 9,254,461 B2 | 2/2016 | Weaver | |
| 2003/0022035 A1 | 1/2003 | Galloway | |
| 2004/0058207 A1 | 3/2004 | Galloway | |
| 2004/0115492 A1 | 6/2004 | Galloway | |
| 2006/0112639 A1 | 6/2006 | Nick | |
| 2007/0017864 A1 | 1/2007 | Price | |
| 2007/0099038 A1 | 5/2007 | Galloway | |
| 2007/0099039 A1 | 5/2007 | Galloway | |
| 2007/0256360 A1 | 11/2007 | Kindig | |
| 2008/0016770 A1 | 1/2008 | Norbeck | |
| 2008/0103220 A1 | 5/2008 | Cherry | |
| 2008/0193351 A9 | 8/2008 | Boardman et al. | |
| 2008/0210089 A1 | 9/2008 | Tsangaris | |
| 2008/0300326 A1 | 12/2008 | Schneider | |
| 2009/0007484 A1 | 1/2009 | Smith | |
| 2009/0082604 A1 | 3/2009 | Agrawal | |
| 2009/0158663 A1 | 6/2009 | Deluga | |
| 2009/0318572 A1 | 12/2009 | Sakai | |
| 2010/0018120 A1 | 1/2010 | Kangasoja | |
| 2010/0096594 A1 | 4/2010 | Dahlin | |
| 2010/0129691 A1 | 5/2010 | Dooher | |
| 2010/0186291 A1 | 7/2010 | Yie | |
| 2011/0117006 A1 | 5/2011 | Ljunggren | |
| 2011/0179712 A1 | 7/2011 | Thacker | |
| 2011/0232161 A1 | 9/2011 | Siskin | |
| 2011/0258914 A1 | 10/2011 | Banasiak | |
| 2011/0308157 A1 | 12/2011 | Zhang | |
| 2011/0314736 A1 | 12/2011 | Crespin | |
| 2011/0314881 A1 | 12/2011 | Hatcher | |
| 2012/0058921 A1 | 3/2012 | Van Den Berg | |
| 2012/0101318 A1 | 4/2012 | Ramirez Corredores | |
| 2012/0266530 A1 | 10/2012 | Ellis | |
| 2013/0008081 A1 | 1/2013 | Weaver | |
| 2013/0011756 A1 | 1/2013 | Weaver | |
| 2013/0079565 A1 | 3/2013 | Miller | |
| 2013/0180489 A1 | 7/2013 | Reeh | |
| 2013/0263498 A1 | 10/2013 | Kania et al. | |
| 2013/0327626 A1 | 12/2013 | Daugaard | |
| 2014/0059921 A1 | 3/2014 | Weaver | |
| 2015/0251125 A1 | 9/2015 | Weaver | |
| 2015/0252268 A1 | 9/2015 | Weaver | |
| 2015/0252275 A1 | 9/2015 | Weaver | |
| 2015/0275109 A1 | 10/2015 | Weaver | |
| 2015/0307784 A1 | 10/2015 | Weaver | |

FOREIGN PATENT DOCUMENTS

| | | |
|---|---|---|
| JP | 54117504 | 9/1979 |
| WO | WO2007122880 | 11/2007 |
| WO | WO2008028169 | 3/2008 |
| WO | WO2011052265 | 5/2011 |
| WO | WO2011097584 | 8/2011 |
| WO | WO2012009168 | 1/2012 |

OTHER PUBLICATIONS

Bain, R.L. et al., "Highlights of Biopower Technical Assessment: State of the Industry and Technology," NREL—National Renewable Energy Laboratory, Golden, CO, Apr. 2003, pp. 1-47.
Biomass Energy Data Book, 2011, http://cta.ornl.gov/bedb.
Non-Final Office Action for U.S. Appl. No. 14/638,959, mailed Apr. 7, 2016.
De Klerk, "Fischer-Tropsch Process," Kirk-Othmer Encyclopedia of Chemical Technology, Jan. 2013, 36 pages.
Franco, "The study of reactions influencing the biomass steam gasification process," Fuel 82, 2003, pp. 835-842.

* cited by examiner

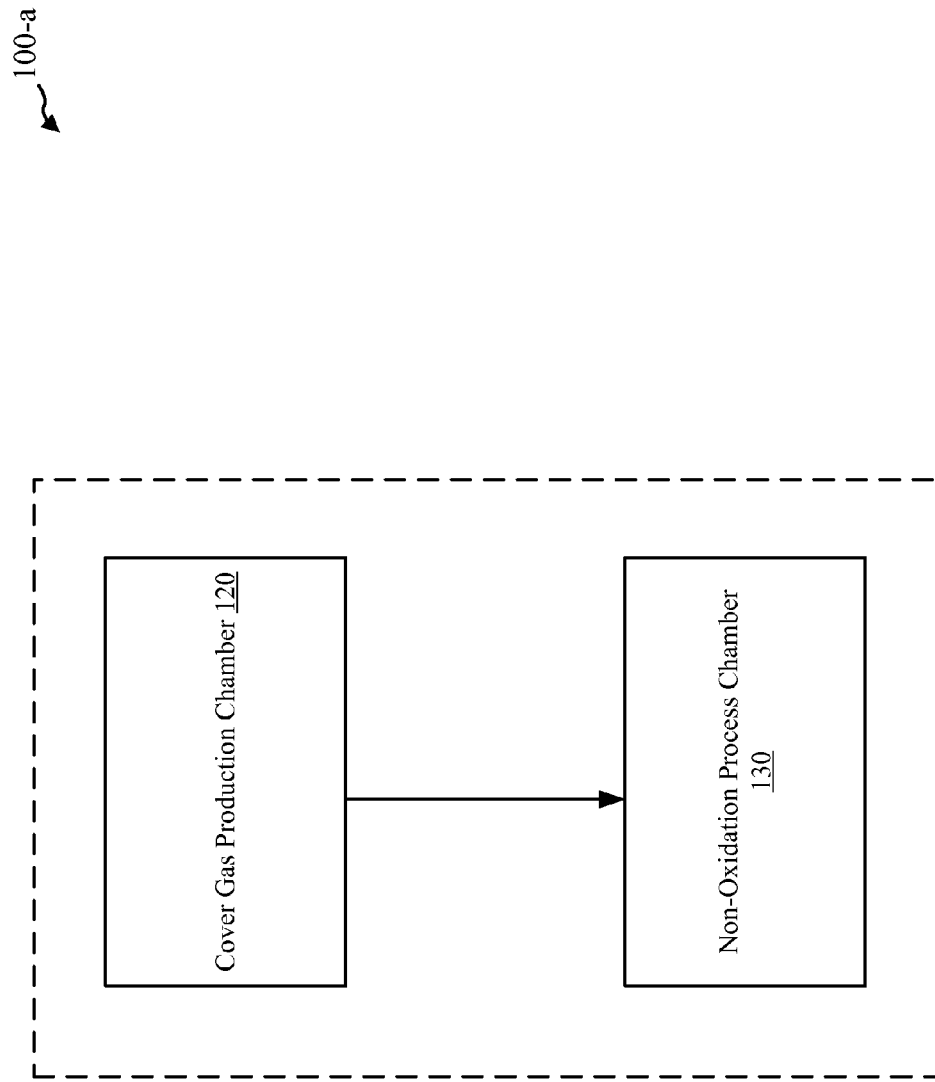

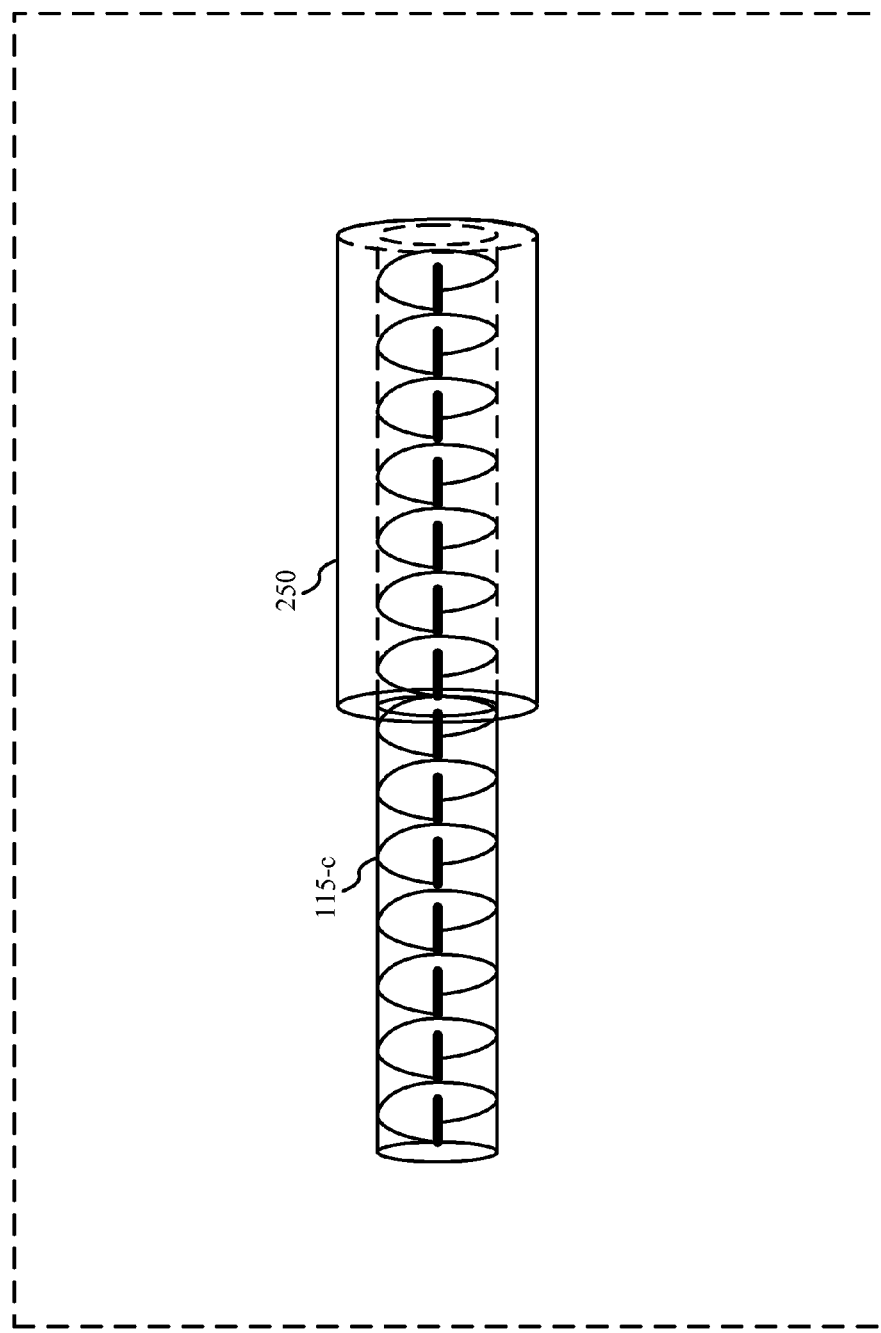

CONTINUOUS LIQUID FUEL PRODUCTION METHODS, SYSTEMS, AND DEVICES

CROSS-REFERENCES TO RELATED APPLICATIONS

This application is a non-provisional patent application claiming priority benefit of U.S. provisional patent application Ser. No. 61/948,094, filed on Mar. 5, 2014 and entitled "METHODS, SYSTEMS, AND DEVICES FOR CONTINUOUS LIQUID FUEL PRODUCTION," the entire disclosure of which is herein incorporated by reference for all purposes.

BACKGROUND

There have generally been several methods of hydrogen extraction from cellulose ($C_6H_{10}O_5$). One of the methods is generally focused on using microbial bugs along with sodium hydroxide (NaOH) and a catalyst to cause a reaction that may release the hydrogen in cellulose and captures the carbon in cellulose as sodium carbonate ($Na_2CO_3$). There may still be a remaining need for developing a simpler and cost effective way of generating hydrogen gas from all C—O—H compounds found in cellulosic biomass more generally, and in a fashion that may allow efficient use of the resulting hydrogen for use on-site, for purification, packaging, and distribution or for power generation from the reaction-product hydrogen gas using a reciprocating engine, turbine, or fuel cell, for example.

While various cellulosic biomass hydrogen extraction techniques exist in the art, there may still be a general need for the development of alternative techniques that may be cost effective, energy efficient, and/or useful for applications using hydrogen, including hydrogen on demand and/or hydrogen-based liquid fuels.

BRIEF SUMMARY

Methods, systems, and devices for continuous production of liquid fuel are provided. Some embodiments may utilize two non-oxidation platforms, for example two pyrolysis platforms, which may utilize biomass or other carbon-oxygen-hydrogen (C—O—H) compounds, as a feedstock. One platform may generally utilize a high temperature pyrolysis process that may generate at least hydrogen and carbon monoxide. This high temperature gas stream may be fed into a lower temperature fast pyrolysis stream as a cover gas. The hot cover gas may react with the fast pyrolysis vapors hydrotreating while the vapors may still be hot and the molecules may still be small. The reacted product may then be distilled on the cool down. This may provide a rapid continuous process for the production of liquid fuels from biomass or other compounds that include C—O—H compounds.

Some embodiments include creating a cover gas of hydrogen and carbon monoxide from heating a C—O—H compound to at least 700 degrees Celsius. The C—O—H compound may be a wet biomass in some cases, where water has been added to the biomass. This wet biomass in generally is a non-slurry wet biomass. Some embodiments may utilize a dry biomass. In some cases, a dry biomass or dry C—O—H compound in general may produce more carbon monoxide and less hydrogen. The cover gas may be fed into a fast pyrolysis process, which may operate at a temperature of at least 400 degrees Celsius. The fast pyrolysis may create bio-oil in some cases. The fast pyrolysis may utilize biomass or other C—O—H compounds. The feedstock may generally be dry, or as dry as possible. The biomass or other C—O—H compound may generally be dry. The mix of cover gas and pyrolysis oil vapors may be passed over one or more catalysts to upgrade to liquid fuels. This may include utilizing a carbon bed, which may be heated. The carbon bed may turn the entrained water into hydrogen and carbon monoxide.

Some embodiments include a method of continuous fuel production that may include: producing a cover gas comprising at least hydrogen and carbon monoxide; and/or utilizing the cover gas with respect to a first non-oxidation process to produce one or more reaction products.

In some embodiments of the method, producing the cover gas includes heating a carbon-oxygen-hydrogen (C—O—H) compound to produce at least the hydrogen and carbon monoxide through a second non-oxidation process. The second non-oxidation process may include a pyrolysis reaction. The pyrolysis reaction may occur at a temperature of at least 700 degrees, at least 800 degrees Celsius, at least 900 degrees Celsius, at least 1,000 degrees Celsius, and/or 1,100 degrees Celsius. Some embodiments may utilize a temperature range between 700 degrees Celsius and 1,100 degrees Celsius.

In some embodiments, the first non-oxidation process occurs at a temperature of at least 400 degrees Celsius. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius. The first non-oxidation process may include a pyrolysis process utilizing a C—O—H compound to produce the one or more reaction products. The C—O—H compound may include biomass. The one or more reaction products may include at least a bio-oil. Other reaction products may be produced.

Some embodiments of the method may include passing the one or more reaction products through a carbon bed. Passing the one or more reaction products through the carbon bed may remove water from the one or more reaction products. Passing the one or more reaction products through the carbon bed may generate at least additional hydrogen or additional carbon monoxide.

In some embodiments of the method, the first non-oxidation process includes a fast pyrolysis process. Some embodiments may include passing at least a portion of the cover gas and the one or more reaction products through one or more catalysts to generate one or more liquid fuels. The liquid fuels may include, but are not limited to, gasoline, diesel, and/or aviation fuel.

In some embodiments of the method, producing the cover gas includes: producing a first wet carbon-oxygen-hydrogen (C—O—H) compound comprising at least a first C—O—H compound and water; and/or heating the first wet C—O—H compound such that the water comprising the first wet C—O—H compound reacts with the first C—O—H compound to generate at least the hydrogen and the carbon monoxide. Heating the first wet C—O—H compound may include heating the first wet C—O—H compound to at least 700 degrees Celsius. Other temperatures may be utilized including at least 800 degrees Celsius, 900 degrees Celsius, 1,000 degrees Celsius, and/or 1,100 degrees Celsius. Some embodiments may utilize a temperature range between 700 degrees Celsius and 1,100 degrees Celsius.

In some embodiments of the method, the first non-oxidation process includes heating a second wet C—O—H compound comprising at least a second C—O—H compound and water such that the water comprising the second wet C—O—H compound reacts with at least the second C—O—H compound or the cover gas to generate the one or more reaction products. Heating the second wet C—O—H compound may include heating the second wet C—O—H compound to at least 400 degrees Celsius. Other temperature ranges may be utilized in some embodiments.

Some embodiments include a system for continuous fuel production. The system may include: a cover gas production chamber configured to produce a cover gas comprising at least hydrogen and carbon monoxide; and/or a non-oxidation process chamber configured to utilize the cover gas with respect to a first non-oxidation process to produce one or more reaction products.

In some embodiments, the cover gas production chamber is configured to produce the cover gas through heating a carbon-oxygen-hydrogen (C—O—H) compound to produce at least the hydrogen and carbon monoxide through a second non-oxidation process. In some embodiments, the second non-oxidation process includes a pyrolysis reaction. The cover gas production chamber may be configured such that the pyrolysis reaction occurs at a temperature of at least 700 degrees Celsius. Other temperatures may be utilized including at least 800 degrees Celsius, 900 degrees Celsius, 1,000 degrees Celsius, and/or 1,100 degrees Celsius. Some embodiments may utilize temperatures between 700 degrees Celsius and 1,100 degrees Celsius.

The non-oxidation process chamber may be configured such that the first non-oxidation process occurs at a temperature of at least 400 degrees Celsius. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius. The non-oxidation process may include a pyrolysis process utilizing a C—O—H compound to produce the one or more reaction products. The C—O—H compound may include biomass. The one or more reaction products may include at least a bio-oil. Other reaction products may be produced.

Some embodiments of the system include one of more carbon bed chambers or carbon beds coupled with at least the non-oxidation process chamber or the cover gas production chamber such that pass through the one or more reaction products through a carbon bed disposed within the carbon bed chamber. The carbon bed chamber may be configured such that passing the one or more reaction products through the carbon bed may remove water from the one or more reaction products. The carbon bed chamber may be configured such that passing the one or more reaction products through the carbon bed may generate at least additional hydrogen or additional carbon monoxide. Some embodiments include a heater coupled with the carbon bed chamber to heat the carbon bed.

In some embodiments of the system, the first non-oxidation process includes a fast pyrolysis process.

Some embodiments of the system include one or more catalysts coupled with the non-oxidation process chamber or the cover gas production chamber such at least a portion of the cover gas and the one or more reaction products passes through the one or more catalysts to generate one or more liquid fuels. The liquid fuels may include, but are not limited to, gasoline, diesel, and/or aviation fuel.

Some embodiments may include a water supply line configured to produces a first wet carbon-oxygen-hydrogen (C—O—H) compound comprising at least a first C—O—H compound and water; and/or the cover gas production chamber may be configured to heat the first wet C—O—H compound such that the water comprising the first wet C—O—H compound reacts with the first C—O—H compound to generate at least the hydrogen and the carbon monoxide. Heating the first wet C—O—H compound may include heating the first wet C—O—H compound to at least 700 degrees Celsius. In some cases, the water may be combined with the first C—O—H compound before the wet first C—O—H compound is heated and/or is transferred to a chamber where it may be heated.

In some embodiments of the system, the non-oxidation process chamber is configured to heat a second wet C—O—H compound comprising at least a second C—O—H compound and water such that the water comprising the second wet C—O—H compound reacts with at least the second C—O—H compound or the cover gas to generate the one or more reaction products. Heating the second wet C—O—H compound may include heating the second wet C—O—H compound to at least 400 degrees Celsius. In some cases, the water may be combined with the second C—O—H compound before it is heated and/or transferred to a chamber where it may be heated.

Some embodiments include systems, methods, and or devices, as described in the specification and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A shows a continuous fuel production system in accordance with various embodiments.

FIG. 2C is a schematic diagram of a system for conversion of C—O—H compounds into hydrogen, carbon monoxide, and/or liquid fuel in accordance with various embodiments.

DETAILED DESCRIPTION

Figure 1B:
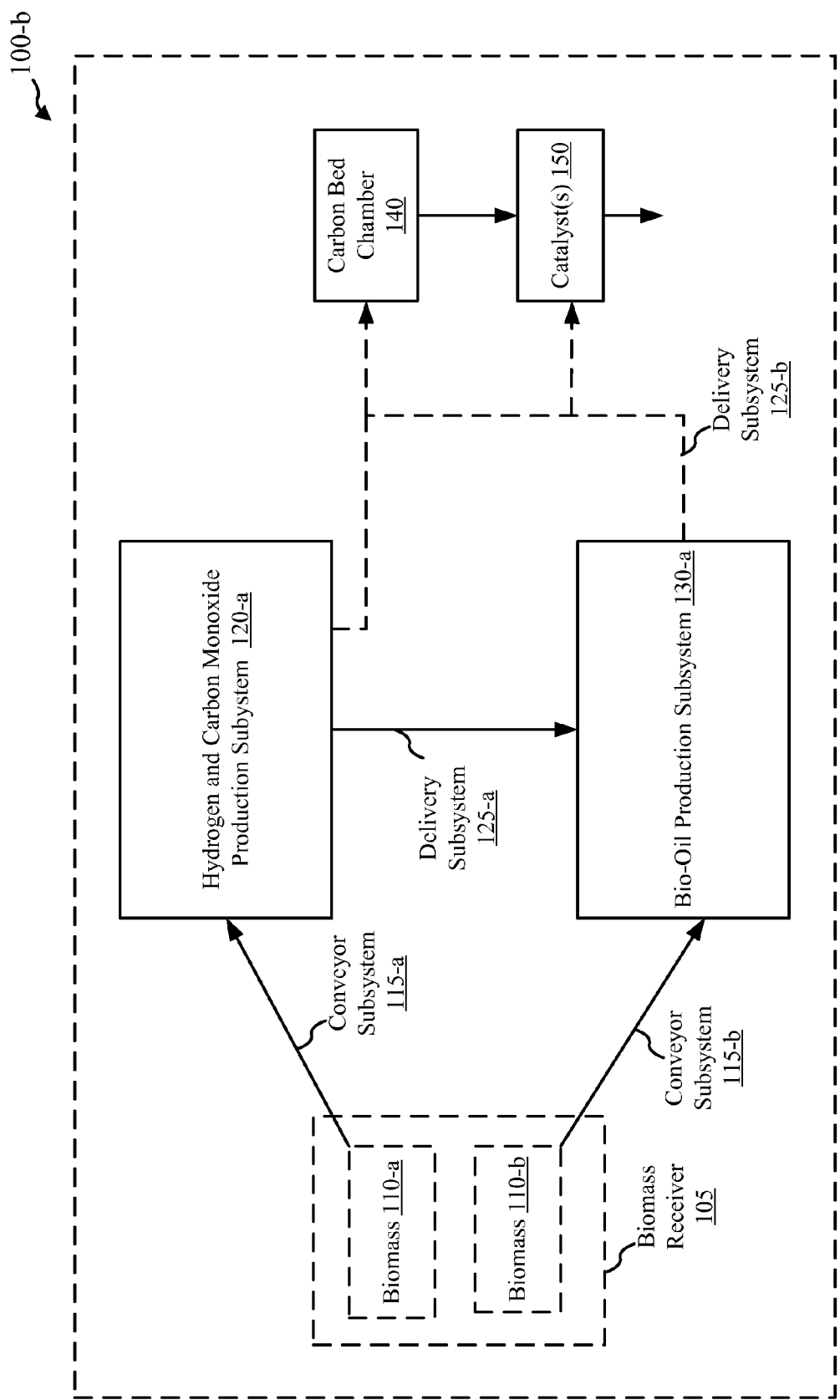
FIG. 1B shows a continuous fuel production system in accordance with various embodiments.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. In some cases, the term process may be interchangeable with the term reaction.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods, systems, and devices for continuous production of liquid fuel are provided. Some embodiments may utilize two non-oxidation platforms, such as pyrolysis platforms, which may utilize biomass or other C—O—H compounds as a feedstock. One platform may generally utilize a high temperature pyrolysis process that may generate at least hydrogen and carbon monoxide. This high temperature gas stream may be fed into a lower temperature fast pyrolysis stream as a cover gas. The hot cover gas may react with the fast pyrolysis vapors hydrotreating while the vapors may still be hot and the molecules may still be small. The reacted product may then be distilled on the cool down. This may provide a rapid continuous process for the production of liquid fuels from biomass or other compounds that include C—O—H compounds.

Some embodiments include creating a cover gas of hydrogen and carbon monoxide from heating a C—O—H compound to at least 700 degrees Celsius. The C—O—H compound may be a wet biomass in some cases, where water has been added to the biomass. This wet biomass in generally may include a non-slurry wet biomass. Some embodiments may utilize a dry biomass. In some cases, a dry biomass or dry C—O—H compound in general may produce more carbon monoxide and less hydrogen. Some embodiments may utilize a pyrolysis reaction that may occur at a temperature of at least 700 degrees, at least 800 degrees Celsius, at least 900 degrees Celsius, at least 1,000 degrees Celsius, and/or 1,100 degrees Celsius. Some embodiments may utilize a temperature range between 700 degrees Celsius and 1,100 degrees Celsius.

The cover gas may be fed into a fast pyrolysis or other non-oxidation process, which may operate at a temperature of at least 400 degrees Celsius. The fast pyrolysis may create bio-oil in some cases. The fast pyrolysis may utilize biomass or other C—O—H compounds. The feedstock may generally be dry, or as dry as possible. The biomass or other C—O—H compound may generally be dry. Some embodiments may utilize a wet C—O—H compound, where water may be combined with a C—O—H compound. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius.

The mix of cover gas and pyrolysis oil vapors may be passed over one or more catalysts to upgrade to liquid fuels. This may include utilizing a carbon bed, which may be heated. The carbon bed may turn the entrained water into hydrogen and carbon monoxide.

Some embodiments utilize a process to produce a cover gas that includes at least hydrogen and carbon monoxide that may then be utilized with respect to a non-oxidation process to produce one or more reaction products.

In some embodiments, producing the cover gas includes heating a carbon-oxygen-hydrogen (C—O—H) compound to produce at least the hydrogen and carbon monoxide through a non-oxidation reaction. The C—O—H compound may include biomass. The non-oxidation reaction may include a pyrolysis reaction. In some cases, the pyrolysis reaction may occur at a temperature of at least 700 degrees Celsius, at least 800 degrees Celsius, at least 900 degrees Celsius, at least 1,000 degrees Celsius, and/or 1,100 degrees Celsius. Merely by way of example, the biomass may include, but are not limited to: lignin, cellulose, hemi-cellulose, palm oil, fatty acids, and/or other C—O—H compounds.

The non-oxidation process may include a pyrolysis process utilizing a C—O—H compound to produce the one or more reaction products. The C—O—H compound may include biomass. The one or more reaction products may include at least a bio-oil. In some cases, the non-oxidation process may occur at a temperature of at least 400 degrees Celsius. Other temperatures may be utilized in some embodiments. Merely by way of example, the biomass may include, but are not limited to: lignin, cellulose, hemi-cellulose, palm oil, fatty acids, and/or other C—O—H compounds. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius.

Some embodiments may include passing the one or more reaction products through a carbon bed. Passing the one or more reaction products through the carbon bed may remove water from the one or more reaction products. Passing the one or more reaction products through the carbon bed may generate at least additional hydrogen or additional carbon monoxide.

The non-oxidation process may include a fast pyrolysis and/or flash pyrolysis process. Different techniques of fast pyrolysis, for example, may be utilized, including, but not limited to: bubbling fluidized bed, circulating fluidized beds and/or transport reactor, rotating cone pyrolyzer, ablative pyrolyzer, vacuum pyrolysis, and/or auger reactor.

Some embodiments include passing at least a portion of the cover gas and the one or more reaction products through one or more catalysts to generate one or more liquid fuels. The liquid fuels may include, but are not limited to, gasoline, diesel, and/or aviation fuel.

In some embodiments, producing the cover gas includes: producing a first wet carbon-oxygen-hydrogen (C—O—H) compound comprising at least a first C—O—H compound and water; and/or heating the first wet C—O—H compound such that the water comprising the first wet C—O—H compound reacts with the first C—O—H compound to generate at least the hydrogen and the carbon monoxide. Heating the first wet C—O—H compound may include heating the first wet C—O—H compound to at least 700 degrees, at least 800 degrees Celsius, at least 900 degrees Celsius, at least 1,000 degrees Celsius, and/or 1,100 degrees Celsius. In some embodiments, the non-oxidation process includes heating a second wet C—O—H compound comprising at least a second C—O—H compound and water such that the water comprising the second wet C—O—H compound reacts with the second C—O—H compound to generate the one or more reaction products. Heating the second wet C—O—H compound may include heating the second wet C—O—H compound to at least 400 degrees Celsius.

Different embodiments may include different combinations of biomass components. For example, combinations of cellulose, lignin, and/or hemicellulose may be used. Many biomass feedstocks may have one or more of a mixture of cellulose, lignin, hemicellulose and/or trace minerals in their component materials. The chemistries described above may thus govern the processing of the feedstock into a process gas stream of hydrogen and $CO_2$ and trace gases. Some embodiments may utilize feedstocks that include C—O—H, such as paper waste, sawdust of a wide variety of wood types, cardboard, hay, straw, switchgrass, municipal solid waste, sanitized waste, simulated nuclear waste, demolition and construction wood waste; these various feedstocks may generally be referred to waste products.

A general overview of a system 100-a for continuous liquid fuel production in accordance with various embodiments is provided with FIG. 1A. System 100-a may include a cover gas production chamber 120. The cover gas production chamber 120 may be configured to facilitate the production of at least hydrogen and carbon monoxide. System 100-a may include a non-oxidation process chamber 130 configured to produce one or more reaction products. The cover gas production chamber 120 may be coupled with the non-oxidation process chamber 130 such that cover gas, such as hydrogen and carbon monoxide gas, may move from the cover gas production chamber 120 to the non-oxidation process chamber 130.

In some embodiments, the cover gas production chamber 120 may be configured to produce the cover gas through heating a carbon-oxygen-hydrogen (C—O—H) compound to produce at least the hydrogen and carbon monoxide through a non-oxidation reaction. The cover gas production chamber 120 may thus be coupled with a heater. The non-oxidation reaction may include a pyrolysis reaction. In some cases, the pyrolysis reaction may occur at a temperature of at least 700 degrees Celsius, at least 800 degrees Celsius, at least 900 degrees Celsius, at least 1,000 degrees Celsius, and/or 1,100 degrees Celsius. A range of temperatures between 700 degrees Celsius and 1,100 degrees Celsius may be utilized in some cases.

In some embodiments, the non-oxidation process chamber 130 may be configured to facilitate a non-oxidation process that may include a pyrolysis process. The non-oxidation process chamber 130 may be coupled with a heater to facilitate the non-oxidation process. The non-oxidation process chamber 130 may be configured to utilize a C—O—H compound to produce the one or more reaction products. The C—O—H compound may include biomass or other C—O—H compounds in general. The one or more reaction products may include at least a bio-oil. In some cases, the non-oxidation process may occur at a temperature of at least 400 degrees Celsius. Other temperatures may be utilized in some embodiments. The non-oxidation process may include a fast pyrolysis process. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius.

Some embodiments of system 100-a may include a carbon bed chamber (not shown) that may be coupled with at least the non-oxidation process chamber 130 or the cover gas production chamber 120. The system 100-a may be configured such that the one or more reaction products and/or the cover gas may be able to pass through a carbon bed of the carbon bed chamber. In some cases, the carbon bed chamber may be configured to be heated. Passing the one or more reaction products through the carbon bed may remove water from the one or more reaction products. Passing the one or more reaction products through the carbon bed may generate at least additional hydrogen or additional carbon monoxide, which may result from the carbon bed being heated.

Some embodiments of system 100-a may include one or more catalysts and/or catalyst chambers (not shown). The system 100-a may be configured such that at least a portion of the cover gas or the one or more reaction products may pass through one or more catalysts to generate one or more liquid fuels. The liquid fuels may include, but are not limited to, gasoline, diesel, and/or aviation fuel.

In some embodiments, the cover gas production chamber 120 may be configured to producing the cover gas through: producing a first wet carbon-oxygen-hydrogen (C—O—H)

compound that may include at least a first C—O—H compound and water; and/or heating the first wet C—O—H compound such that the water comprising the first wet C—O—H compound reacts with the first C—O—H compound to generate at least the hydrogen and the carbon monoxide. The first wet C—O—H compound may be formed outside the cover gas production chamber 120 and then conveyed into the cover gas production chamber 120. Heating the first wet C—O—H compound may include heating the first wet C—O—H compound to at least 700 degrees Celsius, at least 800 degrees Celsius, at least 900 degrees Celsius, at least 1,000 degrees Celsius, and/or 1,100 degrees Celsius. A range of temperatures between 700 degrees Celsius and 1,100 degrees Celsius may be utilized in some cases. In some embodiments, the non-oxidation process chamber 130 may be configured for a non-oxidation process that may include heating a second wet C—O—H compound that may include at least a second C—O—H compound and water such that the water comprising the second wet C—O—H compound reacts with the second C—O—H compound to generate the one or more reaction products. The first wet C—O—H compound may be formed outside the non-oxidation process chamber 130 and then conveyed into the outside the non-oxidation process chamber 130. Heating the second wet C—O—H compound may include heating the second wet C—O—H compound to at least 400 degrees Celsius. Other temperature ranges may be utilized in some cases.

A general overview of a system 100-*b* for continuous liquid fuel production in accordance with various embodiments is provided with FIG. 1B. System 100-*b* may be an example of system 100-*a* of FIG. 1A.

System 100-*b* may include a hydrogen and carbon monoxide production subsystem 120-*a*. The hydrogen and carbon monoxide production subsystems 120-*a* may be an example of the cover gas production chamber 120 of FIG. 1A. The hydrogen and carbon monoxide production subsystems 120-*a* may be configured to produce hydrogen gas and carbon monoxide from a first biomass 110-*a*. System 100-*b* may include a bio-oil production subsystem 130-*a*. The bio-oil production subsystem 130-*a* may be an example of the non-oxidation process chamber 130 of FIG. 1A. The bio-oil production subsystem 130-*a* may be configured to produce bio-oil from a second biomass 110-*a*. The first biomass 110-*a* and the second biomass 110-*b* may be part of the same or different biomass streams. Each biomass may include a wide variety of biomass. In general, each biomass stream includes materials that include carbon, oxygen, and hydrogen. Merely by way of example, the biomass 110-*a* and/or 110-*b* may include, but are not limited to: lignin, cellulose, hemi-cellulose, palm oil, fatty acids, and/or other C—O—H compounds, some of which are discussed herein.

One or more biomass receivers 105 may be configured to receive the biomass 110-*a* and/or 110-*b*. One or more conveyor subsystems 115-*a* and/or 115-*b* may be configured to deliver one or more portions of the biomass 110-*a* and/or 110-*b* to the hydrogen and carbon monoxide production subsystem 120-*a* and/or the bio-oil production subsystem 130-*a*. The hydrogen and carbon monoxide production subsystem 120-*a* and/or the bio-oil production subsystem 130-*a* may be configured to operate concurrently, which may facilitate continuous liquid fuel production. The hydrogen and carbon monoxide production subsystem 120-*a* and the bio-oil production subsystem 130-*a* may be coupled with each other through delivery subsystem 125-*a* in order to convey cover gas, such as hydrogen and carbon monoxide to the bio-oil production subsystem 130-*a*.

Some embodiments of system 100-*b* may include a carbon bed chamber 140 that may be coupled with at least the bio-oil production subsystem 130-*a* and/or the hydrogen and carbon monoxide production subsystem 120-*a*. The system 100-*b* may be configured such that the one or more reaction products and/or the cover gas may be able to pass through a carbon bed of the carbon bed chamber 140. In some cases, the carbon bed chamber 140 may be configured to be heated. Passing the one or more reaction products through the carbon bed may remove water from the one or more reaction products. Passing the one or more reaction products through the carbon bed may generate at least additional hydrogen or additional carbon monoxide.

Some embodiments of system 100-*b* may include one or more catalysts 150 and/or catalyst chambers. The system 100-*b* may be configured such that at least a portion of the cover gas, such as hydrogen and carbon monoxide, or the one or more reaction products may pass through one or more catalysts to generate one or more liquid fuels. The liquid fuels may include, but are not limited to, gasoline, diesel, and/or aviation fuel. The catalyst(s) 150 may be coupled with the carbon bed chamber 140 and/or the bio-oil production subsystem 130-*a* and/or the hydrogen and carbon monoxide production subsystem 120-*a* through one or more aspects of a delivery subsystem 125-*b*.

In some embodiments, the hydrogen and carbon monoxide production subsystem 120-*a* may be configured to produce the cover gas through heating a carbon-oxygen-hydrogen (C—O—H) compound to produce at least the hydrogen and carbon monoxide through a non-oxidation reaction. The hydrogen and carbon monoxide production subsystem 120-*a* may thus be coupled with a heater. The non-oxidation reaction may include a pyrolysis reaction. In some cases, the pyrolysis reaction may occur at a temperature of at least 700 degrees, at least 800 degrees Celsius, at least 900 degrees Celsius, at least 1,000 degrees Celsius, and/or 1,100 degrees Celsius. A range of temperatures between 700 degrees Celsius and 1,100 degrees Celsius may be utilized in some cases.

In some embodiments, the bio-oil production subsystem 130-*a* may be configured to facilitate a non-oxidation process that may include a pyrolysis process. The non-oxidation process chamber 130 may be coupled with a heater to facilitate the non-oxidation process. The bio-oil production subsystem 130-*a* may be configured to utilize a C—O—H compound to produce the one or more reaction products. The C—O—H compound may include biomass. The one or more reaction products may include at least a bio-oil. In some cases, the non-oxidation process may occur at a temperature of at least 400 degrees Celsius. The non-oxidation process may include a fast pyrolysis process. Other temperatures may be utilized in some embodiments. For example, some embodiments may utilize a temperature between 400 degrees Celsius and 700 degrees Celsius. Some embodiments may utilize a temperature range between 500 degrees Celsius and 550 degrees Celsius.

In some embodiments, the hydrogen and carbon monoxide production subsystem 120-*a* may be configured to producing the cover gas through: producing a first wet carbon-oxygen-hydrogen (C—O—H) compound that may include at least a first C—O—H compound and water; and/or heating the first wet C—O—H compound such that the water comprising the first wet C—O—H compound reacts with the first C—O—H compound to generate at least the hydrogen and the carbon monoxide. The first wet C—O—H compound may be formed outside the hydrogen and carbon monoxide production subsystem 120-*a* and then conveyed into the hydrogen and carbon monoxide production subsystem 120-*a*. Heating the first wet C—O—H compound may include heating the first wet C—O—H compound to at least 900 degrees Celsius. Some embodiments may utilize other temperatures such as at least 700 degrees, at least 800 degrees Celsius, at least 1,000 degrees Celsius, and/or 1,100 degrees Celsius. A temperature range between 700 degrees Celsius and 1,100 degrees Celsius may be utilized on some cases.

In some embodiments, the bio-oil production subsystem 130-a may be configured for a non-oxidation process that may include heating a second wet C—O—H compound that may include at least a second C—O—H compound and water such that the water comprising the second wet C—O—H compound reacts with the second C—O—H compound to generate the one or more reaction products. The first wet C—O—H compound may be formed outside the bio-oil production subsystem 130-a and then conveyed into the bio-oil production subsystem 130-a. Heating the second wet C—O—H compound may include heating the second wet C—O—H compound to at least 400 degrees Celsius. Other temperatures may be utilized in other embodiments.

Figure 2A:
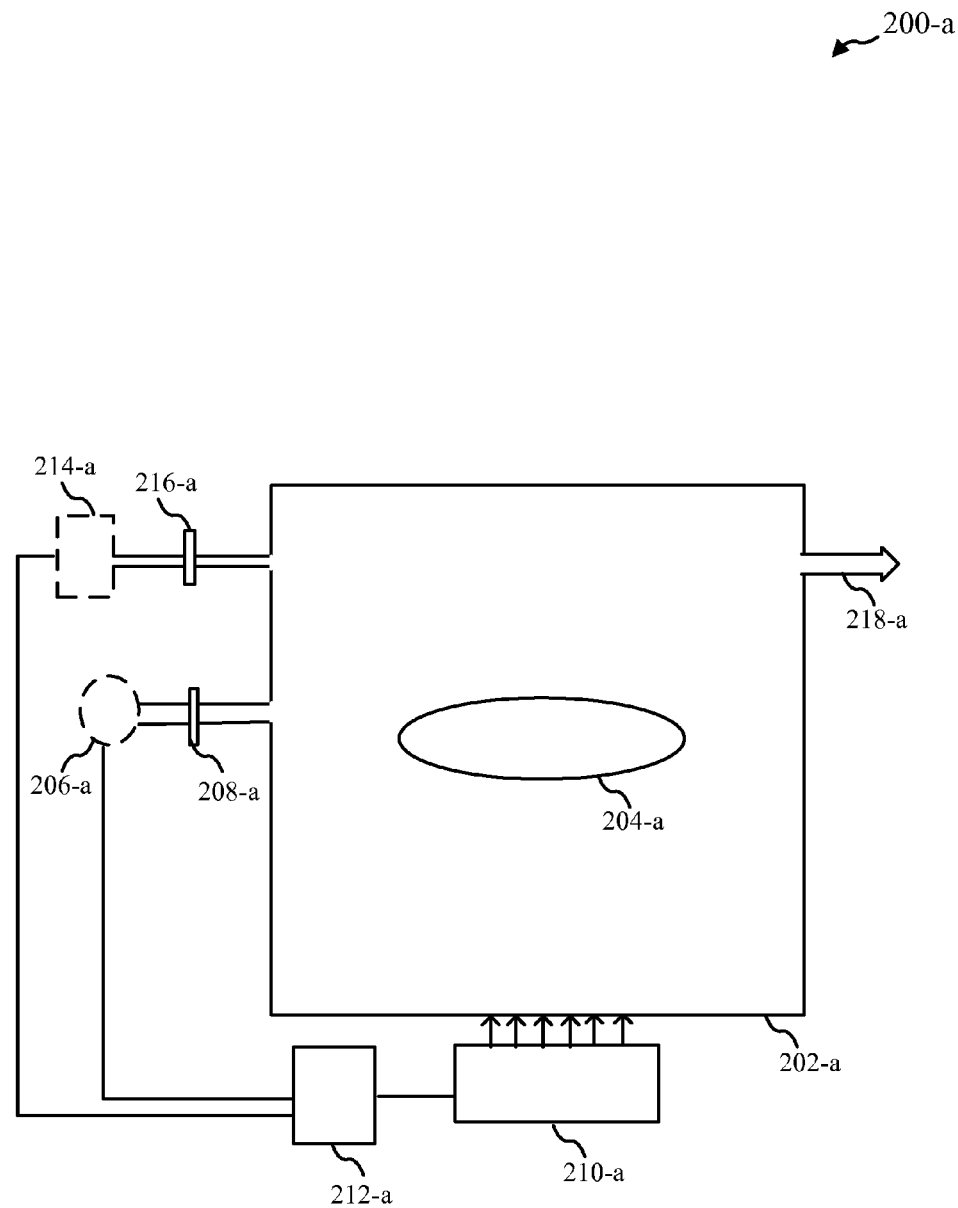
FIG. 2A is a schematic diagram of a system for conversion of C—O—H compounds into hydrogen, carbon monoxide, and/or liquid gas in accordance with various embodiments.

A general overview of a simplified system 200-a for conversion of a C—O—H compound into hydrogen and carbon monoxide as a cover gas and/or for use as to produce non-oxidation reactions with various embodiments is provided with FIG. 2A. In some embodiments, system 200-a may be an example of the cover gas production chamber 120 of FIG. 1A, the non-oxidation process chamber 130 of FIG. 1A, the hydrogen and carbon monoxide production subsystem 120-a of FIG. 1B, and/or the bio-oil production subsystem 130-a.

The system 200-a may include a chamber 202-a, a heating system 210-a in a thermal communication with the chamber 202-a, an optional gas supply line 214-a for providing inert gas into the chamber 202-a, an optional water supply line 206-a for water to be added to the chamber 202-a by using optional valve 208-a, an exhaust line 218-a to allow the product gases (such as hydrogen and carbon monoxide in some cases, or to produce other non-oxidation reaction products, depending on the specific compound(s) used) to exit the chamber 202-a to flow into other components (now shown). The C—O—H compound 204-a may be disposed within the chamber 202-a. Examples of C—O—H compounds 204-a that may be found suitable for methods in accordance with various embodiments may include, but are not limited to, sources of cellulose, hemicellulose, and/or sources of lignin. Other C—O—H compounds may also be utilized. Some processes may use an inert gas, and the controller 212-a may control when to continuously purge chamber 202-a with inert gas by using a valve 216-a. The controller 212-a may also control the heating system 210-a to provide the elevated temperatures that the chamber needs to cause the C—O—H compound 204-a to be dissociated in the environment within the chamber 202-a.

In some embodiments, the heating system 202-a may be configured to heat the chamber 202-a to at least 900 degrees Celsius. Other temperatures may be utilized such as at least 700 degrees, at least 800 degrees Celsius, at least 900 degrees Celsius, at least 1,000 degrees Celsius, and/or 1,100 degrees Celsius. Some embodiments may utilize a temperature range between 700 degrees Celsius and 1,100 degrees Celsius. These temperatures may generally be utilized to generate the cover gas.

In some embodiments, the heating system 202-a may be configured to heat the chamber 202-a to at least 400 degrees Celsius. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius. These temperatures may generally be utilized to produce the one or more reaction products, such as bio-oil.

The controller 212-a may also control the rate of speed of the insertion of feedstock into the chamber 202-a. In some embodiments, the controller 212-a may further control the temperature of the heating system 210-a to convert feedstock and to heat the C—O—H compound 204-a to cause the chemical reaction of the C—O—H compound 204-a. In some cases, the exhaust line 218-a may be utilized to couple two or more chambers 202 with respect to each other. For example an exhaust line 218-a may be utilized to convey a cover gas from one chamber 202 to another chamber 202.

During the biomass processing, the system 200-a may run at atmospheric pressure to very slightly positive pressure, up to about 20 torr positive pressure. This may serve to minimize leaks in the system and significantly reduces the risk of an escalating pressure event. In one embodiment, the system runs about 7 torr positive pressure.

In some embodiments, the optional water supply line 206-a may be configured such that water may be combined with the C—O—H compound to create a wet form of the compound before it is introduced into chamber 202-a. Some embodiments may include a conveyor mechanism (not shown) that may be utilized to transfer the wet compound into the chamber 202-a.

In some embodiments, the reaction product may include hydrogen and carbon monoxide. In some cases, the reaction product may include bio-oil.

Figure 2B:
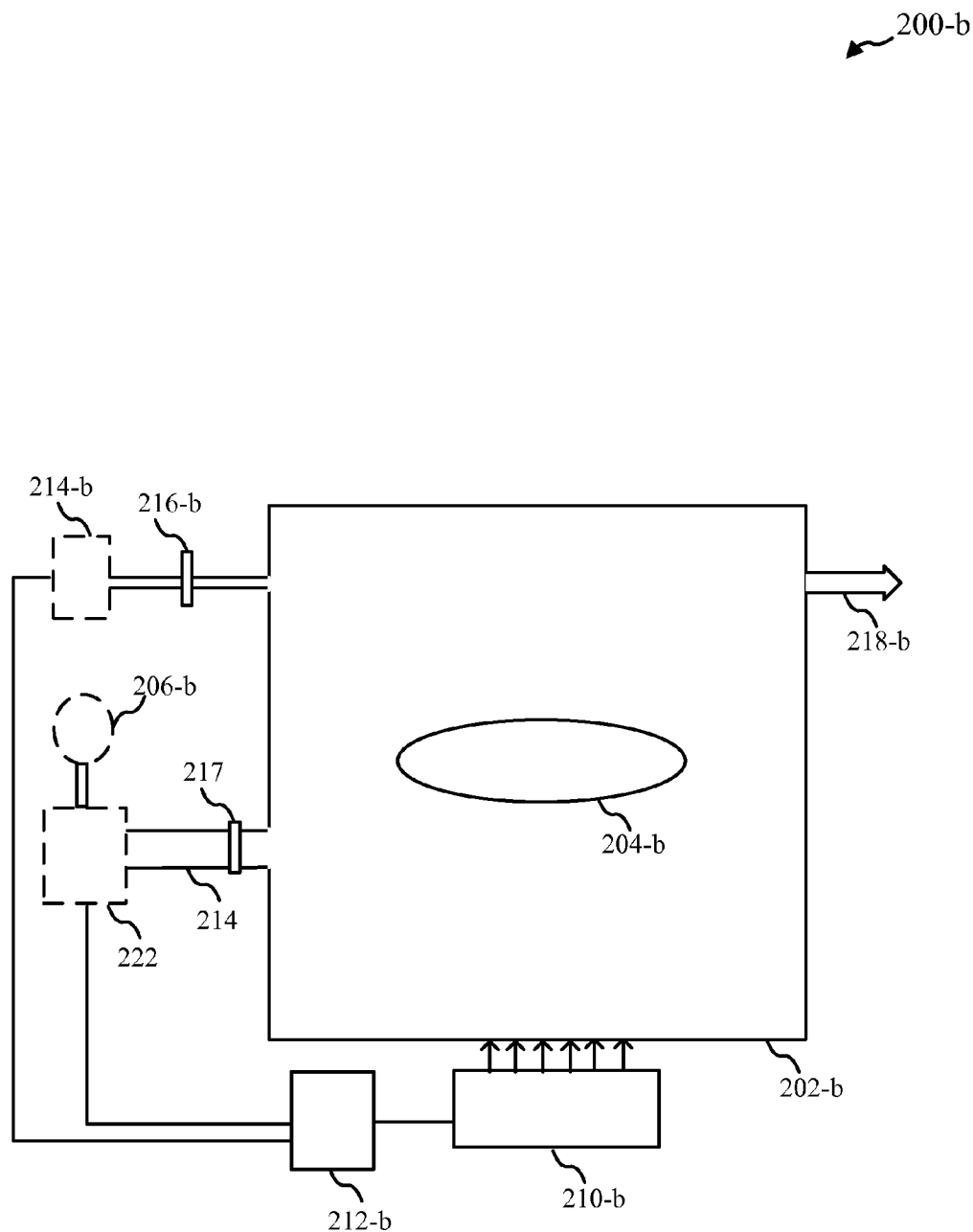
FIG. 2B is a schematic diagram of a system for conversion of C—O—H compounds into hydrogen, carbon monoxide, and/or liquid gas in accordance with various embodiments.

A general overview of another simplified system 200-b for conversion of a C—O—H compound into hydrogen and carbon monoxide as a cover gas or for use as to produce non-oxidation reactions with various embodiments is provided with FIG. 2B. In some embodiments, system 200-b may be an example of the cover gas production chamber 120 of FIG. 1A, the non-oxidation process chamber 130 of FIG. 1A, the hydrogen and carbon monoxide production subsystem 120-a of FIG. 1B, and/or the bio-oil production subsystem 130-a.

The system 200-b may include a chamber 202-b, a heating system 210-b in a thermal communication with the chamber 202-b, an optional gas supply line 214-b for providing inert gas into the chamber 202-b, an optional water supply line 206-b for water to be added to a C—O—H compound within an optional feed stock hopper or chamber 222, an exhaust line 218-b to allow the product gases (such as hydrogen and carbon monoxide, or non-oxidation reaction products such as bio-oil, depending on the specific compound(s) used) to exit the chamber 202-b, and/or a controller 212-b. The C—O—H compound 204-b may disposed within the chamber 202-b. Examples of C—O—H compounds 204-b, which may be wet or dry, that may be found suitable for methods in accordance with various embodiments include, but are not limited to, sources of cellulose, hemicellulose, and/or sources of lignin.

As described further below, some processes may use an inert gas, and the controller 212-b may control when to continuously purge chamber 202-b with inert gas by using a valve 216-b. The controller 212-b may also control the heating system 210-b to provide the elevated temperatures that the chamber needs to cause the C—O—H compound 204-b to be dissociated in the environment within the chamber 202-b.

In some embodiments, the heating system 202-b may be configured to heat the chamber 202-b to at least 700 degrees Celsius, at least 800 degrees Celsius, at least 900 degrees Celsius, at least 1,000 degrees Celsius, and/or 1,100 degrees Celsius. A temperature range between 700 degrees Celsius and 1,100 degrees Celsius may be utilized in some cases.

These temperatures may generally be utilized to generate the cover gas.

In some embodiments, the heating system 202-b may be configured to heat the chamber 202-b to at least 400 degrees Celsius. Some embodiments may utilized other temperatures. For example, some embodiments may utilize a temperature between 400 degrees Celsius and 700 degrees Celsius. Some embodiments may utilize a temperature range between 500 degrees Celsius and 550 degrees Celsius. These temperatures may generally be utilized to produce the one or more reaction products, such as bio-oil.

The controller 212-b may also control the rate of speed of the insertion of feedstock into the chamber 202-b. A valve 217 may be utilized in some cases. The controller 212 may further control the temperature of the heating system 210-b to convert feedstock and to heat the C—O—H compound 204-b to cause the chemical reaction of the C—O—H compound 204-b.

During the biomass processing, the system 200-b may run at atmospheric pressure to very slightly positive pressure, up to about 20 torr positive pressure. This may serve to minimize leaks in the system and significantly reduces the risk of an escalating pressure event. In one embodiment, the system runs about 7 torr positive pressure.

In some embodiments, the optional water supply line 206-b may be configured such that water may be combined with the C—O—H compound to create a wet form of the compound before it is introduced into chamber 202-b, such as in feedstock hopper or chamber 212. Some embodiments may include a conveyor mechanism 214 that may be utilized to transfer the wet or dry compound into the chamber 202-b. Some embodiments may utilize gravity to help transfer the wetted feedstock into chamber 202-b. In some cases, the wetted feedstock may be manually transferred into the chamber 202-b.

In some embodiments, the reaction product may include hydrogen and carbon monoxide. In some cases, the reaction product may include bio-oil.

A general overview of a simplified system 200-c for conversion of a C—O—H compound into hydrogen and carbon monoxide as a cover gas and/or for use as to produce non-oxidation reactions with various embodiments is provided with FIG. 2C. In some embodiments, system 200-c may be an example of aspects of the cover gas production chamber 120 of FIG. 1A, the non-oxidation process chamber 130 of FIG. 1A, the hydrogen and carbon monoxide production subsystem 120-a of FIG. 1B, the bio-oil production subsystem 130-a of FIG. 1B, the system 200-a of FIG. 2A, and/or system 200-b of FIG. 2B. System 200-c may include a tube furnace 250, which may be an example of: the cover gas production chamber 120 of FIG. 1A; the non-oxidation process chamber 130 of FIG. 1A; the hydrogen and carbon monoxide production subsystem 120-a of FIG. 1B; the bio-oil production subsystem 130-a; the chamber 202-a, the heating system 210-a, and/or the controller 212-a of FIG. 2A; and/or the chamber 202-b, the heating system 210-b, and/or the controller 212-b of FIG. 2B. System 200-c may also include an auger 115-c, which may be an example of the conveyor(s) 115 of FIG. 1B.

The tube furnace 250 may be configured to produce a cover gas that includes at least hydrogen and carbon monoxide. This may include utilizing non-oxidation process, such as a pyrolysis process, to heat a C—O—H compound to at least 700 degrees to produce the cover gas. Some embodiments may be configured such that the tube furnace 110-c heats to the C—O—H compound to at least 800 or 900 degrees Celsius; some embodiments may heat the C—O—H compound to at least 1,000 degrees Celsius or 1,100 degrees Celsius.

In some embodiments, the tube furnace 250 may be configured to utilize a cover gas with respect to a non-oxidation process to produce one or more reaction products. The non-oxidation process may occur at a temperature of at least 400 degrees Celsius, though other temperatures may be utilized on some embodiments. For example, some embodiments may utilize a temperature between 400 degrees Celsius and 700 degrees Celsius. Some embodiments may utilize a temperature range between 500 degrees Celsius and 550 degrees Celsius. The non-oxidation process may include a pyrolysis process utilizing a C—O—H compound to produce the one or more reaction products. The C—O—H compound may include biomass or other C—O—H compounds. The one or more reaction products may include at least a bio-oil.

The auger 115-c may affect continuous motion of material into and through the tube furnace 250. In some embodiments, the auger 115-c may include a material composition that may include at least a high-nickel metal alloy, such as a high-nickel steel alloy. In some embodiments, the auger 115-c may include multiple different pitches between multiple blades, though some embodiments may utilize a single uniform blade pitch. In some embodiments of system 200-c, the tube furnace 250 may include a material composition that may include at least a high-nickel metal alloy, such as a high-nickel steel alloy.

Figure 2D:
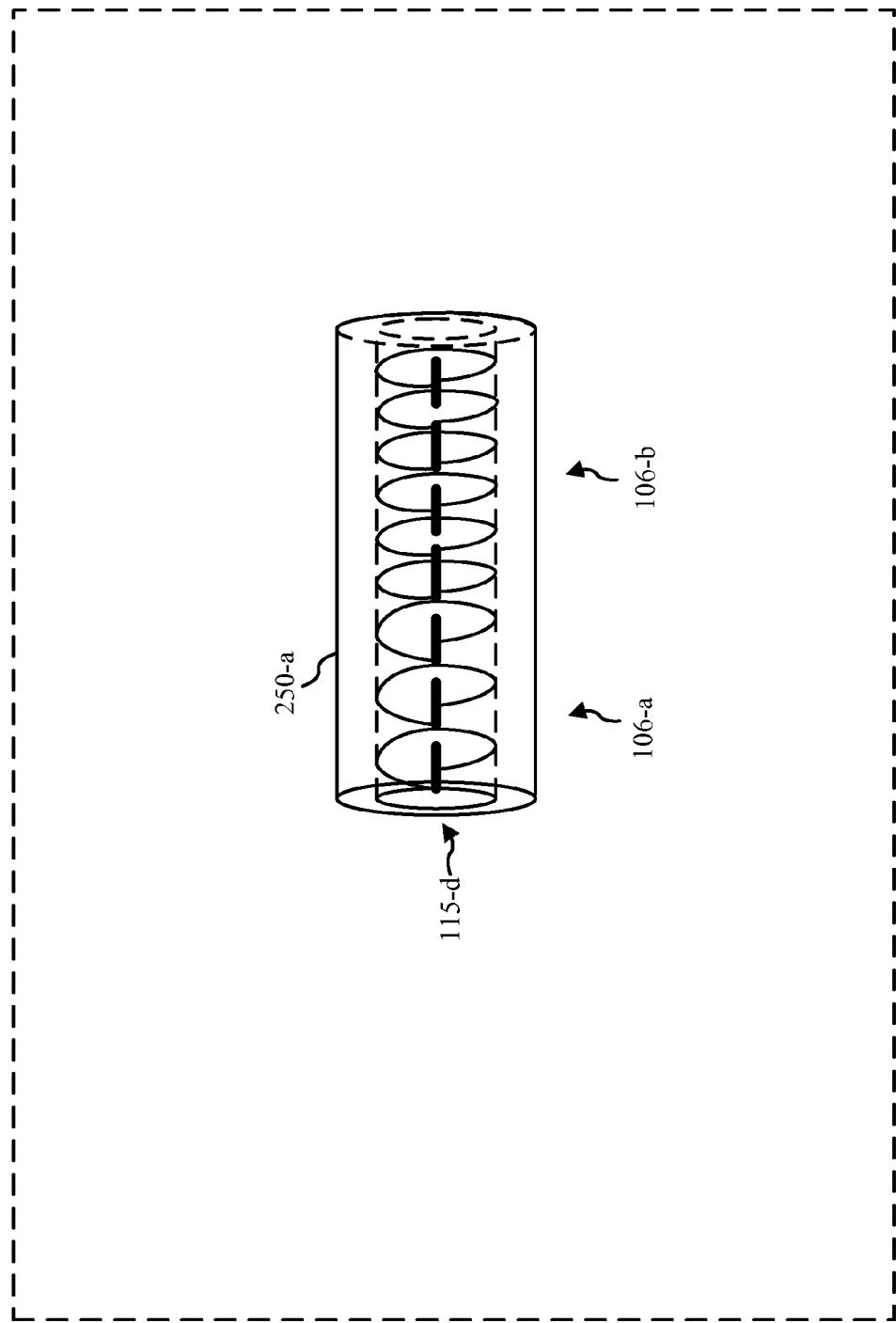
FIG. 2D is a schematic diagram of a system for conversion of C—O—H compounds into hydrogen, carbon monoxide, and/or liquid fuel in accordance with various embodiments.

A general overview of a simplified system 200-d for conversion of a C—O—H compound into hydrogen and carbon monoxide as a cover gas and/or for use as to produce non-oxidation reactions with various embodiments is provided with FIG. 2D. In some embodiments, system 200-d may be an example of aspects the cover gas production chamber 120 of FIG. 1A, the non-oxidation process chamber 130 of FIG. 1A, the hydrogen and carbon monoxide production subsystem 120-a of FIG. 1B, the bio-oil production subsystem 130-a of FIG. 1B, the system 200-a of FIG. 2A, the system 200-b of FIG. 2B, and/or the system 200-c of FIG. 2C.

System 200-d may include a tube furnace 250-a, which may be an example of: the cover gas production chamber 120 of FIG. 1A; the non-oxidation process chamber 130 of FIG. 1A; the hydrogen and carbon monoxide production subsystem 120-a of FIG. 1B; the bio-oil production subsystem 130-a; the chamber 202-a—the heating system 210-a, and/or the controller 212-a of FIG. 2A; the chamber 202-b, the heating system 210-b, and/or the controller 212-b of FIG. 2B; and/or the tube furnace 250 of FIG. 2C. System 200-d may also include an auger 115-d, which may be an example of the conveyor(s) 115 of FIG. 1B or the auger 115-c of FIG. 2C.

The tube furnace 250-a may be configured to produce a cover gas that includes at least hydrogen and carbon monoxide. This may include utilizing non-oxidation process, such as a pyrolysis process, to heat a C—O—H compound to at least 700 degrees to produce the cover gas. Some embodiments may be configured such that the tube furnace 110-c heats to the C—O—H compound to at least 800 or 900 degrees Celsius; some embodiments may heat the C—O—H compound to at least 1,000 degrees Celsius or 1,100 degrees Celsius.

In some embodiments, the tube furnace 250-a may be configured to utilize a cover gas with respect to a non-oxidation process to produce one or more reaction products. The non-oxidation process may occur at a temperature of at least 400 degrees Celsius, though other temperatures may be utilized on some embodiments. For example, some embodiments may utilize a temperature between 400 degrees Celsius and 700 degrees Celsius. Some embodiments may utilize a temperature range between 500 degrees Celsius and 550 degrees Celsius. The non-oxidation process may include a pyrolysis process utilizing a C—O—H compound to produce the one or more reaction products. The C—O—H compound may include biomass or other C—O—H compounds. The one or more reaction products may include at least a bio-oil.

In some embodiments, the auger 115-d may affect continuous motion of material into and through the tube furnace 250-a. The auger 115-d may include a material composition that may include at least a high-nickel metal alloy, such as a high-nickel steel alloy. In some embodiments, the auger 115-d may include multiple different pitches between multiple blades. For example, auger 115-d may have a first section 106-a, which may have blades with a first pitch, and a second section 106-b with a second pitch. In this example, the second pitch may be less than the first pitch. This may result in the material in the tube furnace having a longer residence time per unit length in the second section 106-b, for example. Other variations may be utilized, such as more sections with different pitches. Increasing the pitching of a section may in general decrease the residence time per unit length. In some embodiments, increasing the residence time may be utilized to increase the amount of biochar produced. In some cases, decreasing the residence time may be utilized to affect the amount of pyrolysis occurring. In some embodiments of system 200-d, the tube furnace 250-a may include a material composition that may include at least a high-nickel metal alloy, such as a high-nickel steel alloy.

Figure 3A:
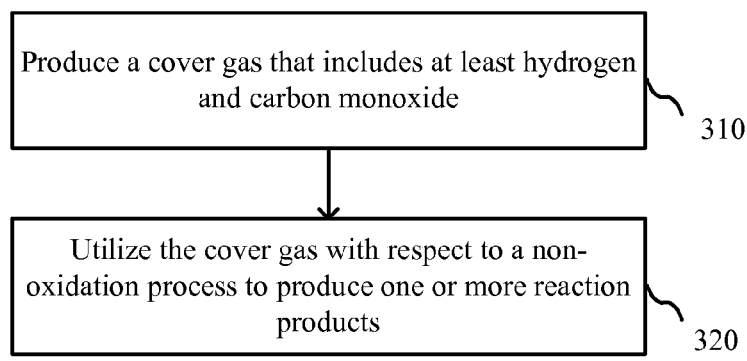
FIG. 3A is a flow diagram for continuous fuel production in accordance with various embodiments.

FIG. 3A provides an overview of a method 300-a of continuous fuel production in accordance with various embodiments. Method 300-a may be implemented utilizing aspects of system 100-a of FIG. 1, system 100-b of FIG. 1B, system 200-a of FIG. 2A, system 200-b of FIG. 2B, system 200-c of FIG. 2C, and/or system 200-d of FIG. 2D. In FIG. 3A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 310, a cover gas may be produced that includes at least hydrogen and carbon monoxide. At block 320, then be utilized the cover gas with respect to a non-oxidation process to produce one or more reaction products.

In some embodiments of method 300-a, producing the cover gas includes heating a carbon-oxygen-hydrogen (C—O—H) compound to produce at least the hydrogen and carbon monoxide through a non-oxidation reaction. The C—O—H compound may include biomass. The non-oxidation reaction may include a pyrolysis reaction. In some cases, the pyrolysis reaction may occur at a temperature of at least 700 degrees Celsius. Merely by way of example, the biomass may include, but are not limited to: lignin, cellulose, hemi-cellulose, palm oil, fatty acids, and/or other C—O—H compounds. Some embodiments may utilize temperatures of at least 800 degrees Celsius, at least 900 degrees Celsius, at least 1,000 degrees Celsius, and/or 1,100 degrees Celsius. A temperature range between 700 degrees Celsius and 1,100 degrees Celsius may be utilized in some cases.

The non-oxidation process may include a pyrolysis process utilizing a C—O—H compound to produce the one or more reaction products. The C—O—H compound may include biomass. The one or more reaction products may include at least a bio-oil. In some cases, the non-oxidation process may occur at a temperature of at least 400 degrees Celsius. Other temperatures may be utilized in some cases. For example, some embodiments may utilize a temperature between 400 degrees Celsius and 700 degrees Celsius. Some embodiments may utilize a temperature range between 500 degrees Celsius and 550 degrees Celsius. Merely by way of example, the biomass may include, but are not limited to: lignin, cellulose, hemi-cellulose, palm oil, fatty acids, and/or other C—O—H compounds as describe herein.

Some embodiments of method 300-a may include passing the one or more reaction products through a carbon bed. Passing the one or more reaction products through the carbon bed may remove water from the one or more reaction products. Passing the one or more reaction products through the carbon bed may generate at least additional hydrogen or additional carbon monoxide.

The non-oxidation process may include a fast pyrolysis and/or flash pyrolysis process. Different techniques of fast pyrolysis, for example, may be utilized, including, but not limited to: bubbling fluidized bed, circulating fluidized beds and/or transport reactor, rotating cone pyrolyzer, ablative pyrolyzer, vacuum pyrolysis, and/or auger reactor.

Some embodiments of method 300-a include passing at least a portion of the cover gas and the one or more reaction products through one or more catalysts to generate one or more liquid fuels. The liquid fuels may include, but are not limited to, gasoline, diesel, and/or aviation fuel.

In some embodiments of method 300-a, producing the cover gas includes: producing a first wet carbon-oxygen-hydrogen (C—O—H) compound comprising at least a first C—O—H compound and water; and/or heating the first wet C—O—H compound such that the water comprising the first wet C—O—H compound reacts with the first C—O—H compound to generate at least the hydrogen and the carbon monoxide. Heating the first wet C—O—H compound may include heating the first wet C—O—H compound to at least 700 degrees Celsius. Some embodiments may utilize temperatures of at least 800 degrees Celsius, at least 900 degrees Celsius, at least 1,000 degrees Celsius, and/or 1,100 degrees Celsius. A temperature range between 700 degrees Celsius and 1,100 degrees Celsius may be utilized in some cases.

In some embodiments, the non-oxidation process includes heating a second wet C—O—H compound comprising at least a second C—O—H compound and water such that the water comprising the second wet C—O—H compound reacts with the second C—O—H compound to generate the one or more reaction products. Heating the second wet C—O—H compound may include heating the second wet C—O—H compound to at least 400 degrees Celsius. Other temperatures may be utilized in some embodiments.

Figure 3B:
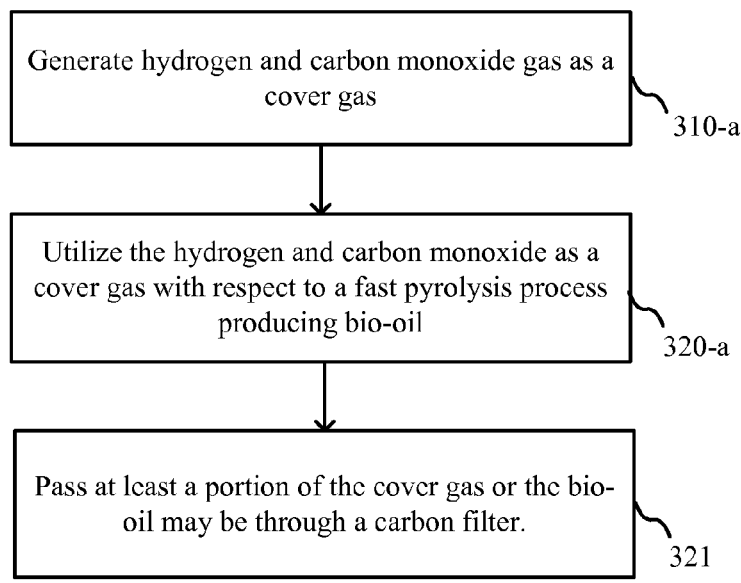
FIG. 3B is a flow diagram for continuous fuel production in accordance with various embodiments.

FIG. 3B provides an overview of a method 300-b of continuous fuel production in accordance with various embodiments. Method 300-b may be implemented utilizing aspects of system 100-a of FIG. 1, system 100-b of FIG. 1B, system 200-a of FIG. 2A, system 200-b of FIG. 2B, system 200-c of FIG. 2C, and/or system 200-d of FIG. 2D. In FIG. 3B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 300-b may be an example of method 300-a of FIG. 3A.

At block 310-a, hydrogen and carbon monoxide cover gas may be generated. At block 320-a, the hydrogen and carbon monoxide cover gas may be utilized with respect to a fast pyrolysis process generating bio-oil. At block 321, at least a portion of the cover gas or the bio-oil may be passed through a carbon filter, which may be heated. In some cases, at least additional hydrogen or additional carbon monoxide may be generated in the process.

Figure 3C:
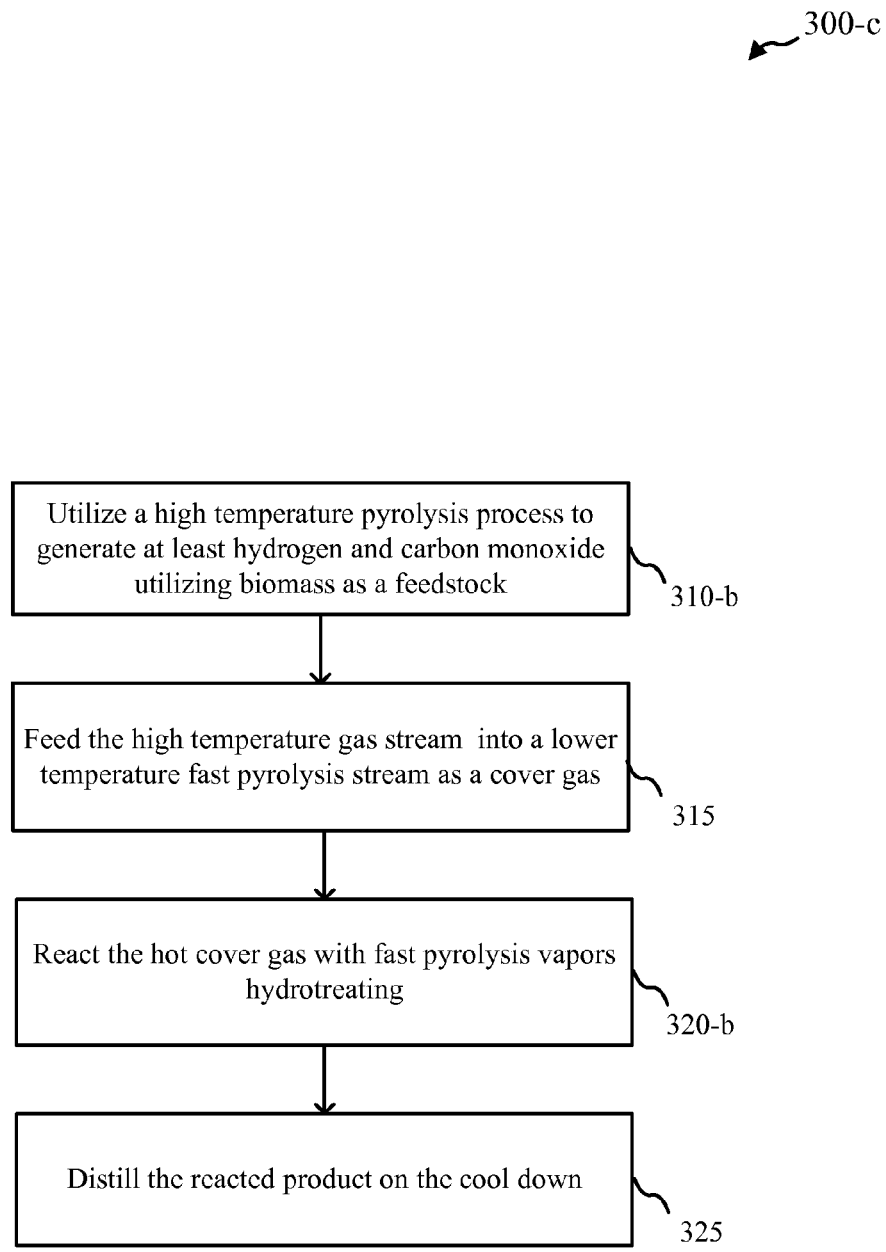
FIG. 3C is a flow diagram for continuous fuel production in accordance with various embodiments.

FIG. 3C provides a method 300-c of continuous liquid fuel production in accordance with various embodiments. Method 300-c may be implemented utilizing aspects of system 100-a of FIG. 1, system 100-b of FIG. 1B, system 200-a of FIG. 2A, system 200-b of FIG. 2B, system 200-c of FIG. 2C, and/or system 200-d of FIG. 2D. In FIG. 3C, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 300-c may be an example of aspects of method 300-a of FIG. 3A and/or method 300-b of FIG. 3B.

At block 310-b, a high temperature pyrolysis process may generate at least hydrogen and carbon monoxide utilizing biomass as a feedstock. At block 315, the high temperature gas stream may be fed into a lower temperature fast pyrolysis stream as a cover gas. At block 320-b, the hot cover gas may react with fast pyrolysis vapors hydrotreating while the vapors may still be hot and the molecules may still be small. At block 325, the reacted product may then be distilled on the cool down. This may provide a rapid continuous process for the production of liquid fuels from biomass or other compounds that include carbon-oxygen-hydrogen (C—O—H) compounds. The liquid fuels may include, but are not limited to, gasoline, diesel, and/or aviation fuel.

Figure 3D:
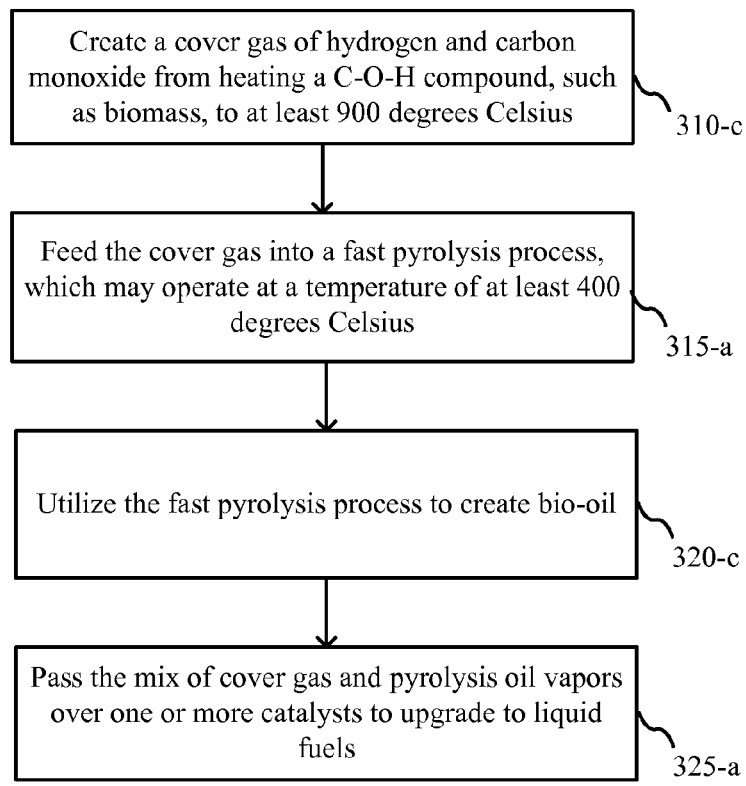
FIG. 3D is a flow diagram for continuous fuel production in accordance with various embodiments.

FIG. 3D provides a method 300-d of continuous fuel production in accordance with various embodiments. Method 300-d may be implemented utilizing aspects of system 100-a of FIG. 1, system 100-b of FIG. 1B, system 200-a of FIG. 2A, system 200-b of FIG. 2B, system 200-c of FIG. 2C, and/or system 200-d of FIG. 2D. In FIG. 3D, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 300-d may be an example of aspects of method 300-a of FIG. 3A, method 300-b of FIG. 3B, and/or method 300-c of FIG. 3C.

At block 310-c, a cover gas of hydrogen and carbon monoxide may be created from heating a C—O—H compound to at least 900 degrees Celsius. The C—O—H compound may be a wet biomass in some cases, where water has been added to the biomass. This wet biomass in generally is a non-slurry wet biomass. Some embodiments may utilize a dry biomass. In some cases, a dry biomass or dry C—O—H compound in general may produce more carbon monoxide and less hydrogen.

At block 315-a, the cover gas may be fed into a fast pyrolysis process, which may operate at a temperature of at least 400 degrees Celsius. At block 320-c, the fast pyrolysis may create bio-oil in some cases. The fast pyrolysis may utilize biomass or other C—O—H compounds. The feedstock may generally be dry, or as dry as possible. The biomass or other C—O—H compound may generally be dry.

At block 325-a, the mix of cover gas and pyrolysis oil vapors may be passed over one or more catalysts to upgrade to liquid fuels. This may include utilizing a carbon bed, which may be heated. The carbon bed may turn the entrained water into hydrogen and carbon monoxide. The liquid fuels may include gasoline, diesel, and/or aviation fuel, for example.

While detailed descriptions of one or more embodiments have been given above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention, which is defined by the appended claims.

What is claimed is:

1. A system for continuous fuel production, the system comprising:
   a cover gas production chamber configured to produce a cover gas comprising at least hydrogen and carbon monoxide;
   a non-oxidation process chamber configured to utilize the cover gas with respect to a first non-oxidation process to produce one or more reaction products; and
   a carbon bed chamber coupled with at least the non-oxidation process chamber or the cover gas production chamber such that the one or more reaction products pass through a carbon bed disposed within the carbon bed chamber.

2. The system of claim 1, wherein the cover gas production chamber is configured to produce the cover gas through heating a carbon-oxygen-hydrogen (C—O—H) compound to produce at least the hydrogen and the carbon monoxide through a second non-oxidation process.

3. The system of claim 2, wherein the second non-oxidation process comprises a pyrolysis reaction.

4. The system of claim 1, wherein the cover gas production chamber is configured to produce the cover gas utilizing a pyrolysis reaction occurring at a temperature of at least 700 degrees Celsius.

5. The system of claim 1, wherein the non-oxidation process chamber is configured such that the first non-oxidation process occurs at a temperature of at least 400 degrees Celsius.

6. The system of claim 1, wherein the first non-oxidation process comprises a pyrolysis process utilizing a C—O—H compound to produce the one or more reaction products.

7. The system of claim 6, wherein the C—O—H compound comprises biomass.

8. The system of claim 1, wherein the one or more reaction products comprises at least a bio-oil.

9. The system of claim 1, wherein the carbon bed chamber is configured such that passing the one or more reaction products through the carbon bed removes water from the one or more reaction products.

10. The system of claim 1, wherein the carbon bed chamber is configured such that passing the one or more reaction products through the carbon bed generates at least additional hydrogen or additional carbon monoxide.

11. The system of claim 10, further comprising a heater coupled with carbon bed chamber to heat the carbon bed.

12. The system of claim 1, wherein the first non-oxidation process comprises a fast pyrolysis process.

13. The system of claim 12, wherein the non-oxidation process chamber is configured such that the first non-oxidation process occurs at a temperature between 500 degrees Celsius and 550 degrees Celsius.

14. The system of claim 1, wherein the cover gas production chamber is configured to produce the cover gas utilizing a pyrolysis reaction occurring at a temperature of at least 900 degrees Celsius.

15. The system of claim 1, wherein the cover gas production chamber is configured to produce the cover gas utilizing a pyrolysis reaction occurring at a temperature between 700 degrees Celsius and 1,100 degrees Celsius.

16. The system of claim 1, further comprising one or more catalysts coupled with the non-oxidation process chamber or the cover gas production chamber such at least a portion of the cover gas and the one or more reaction products passes through the one or more catalysts to generate one or more liquid fuels.

17. The system of claim 16, wherein the one or more liquid fuels comprises at least gasoline, diesel, or aviation fuel.

18. The system of claim 1, further comprising a water supply line configured to produce a wet carbon-oxygen-hydrogen (C—O—H) compound comprising at least a C—O—H compound and water; and wherein the cover gas production chamber is configured to heat the wet C—O—H compound such that the water comprising the wet C—O—H compound reacts with the C—O—H compound to generate at least the hydrogen and the carbon monoxide.

19. The system of claim 18, wherein heating the wet C—O—H compound includes heating the wet C—O—H compound to at least 700 degrees Celsius.

* * * * *